United States Patent
Liao (10) Patent No.: US 10,641,254 B2
(45) Date of Patent: May 5, 2020

(54) PUMPING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 265 days.

(21) Appl. No.: 15/947,122

(22) Filed: Apr. 6, 2018

(65) Prior Publication Data
US 2019/0309739 A1    Oct. 10, 2019

(51) Int. Cl.
| F04B 9/14 | (2006.01) |
| F04B 53/10 | (2006.01) |
| F16K 11/07 | (2006.01) |
| B67D 7/02 | (2010.01) |
| F04B 23/02 | (2006.01) |

(52) U.S. Cl.
CPC .............. *F04B 9/14* (2013.01); *B67D 7/0205* (2013.01); *F04B 53/1092* (2013.01); *F16K 11/0712* (2013.01); *F04B 23/025* (2013.01)

(58) Field of Classification Search
CPC .... F04B 23/025; F04B 53/10; F04B 53/1092; F04B 9/14; F16K 11/07; F16K 11/0712; F16K 31/18; F16K 31/44; B67D 7/0205; B67D 7/60
USPC .......... 417/118; 141/26, 21, 25, 309, 41, 44; 137/565.25
See application file for complete search history.

(56) References Cited

U.S. PATENT DOCUMENTS

| 6,357,492 B1 * | 3/2002 | Hsu | B67D 7/0205 |
| | | | 137/565.25 |
| 7,367,366 B2 * | 5/2008 | Liao | F04B 33/00 |
| | | | 141/26 |
| 8,240,433 B2 * | 8/2012 | Tseng | F04B 9/14 |
| | | | 184/1.5 |
| 8,578,974 B2 * | 11/2013 | Bonner | F04B 23/028 |
| | | | 141/59 |
| 8,651,458 B2 * | 2/2014 | Liao | B25B 11/007 |
| | | | 254/133 R |

FOREIGN PATENT DOCUMENTS

TW           I318961 B    1/2010

\* cited by examiner

*Primary Examiner* — Dominick L Plakkoottam
(74) *Attorney, Agent, or Firm* — Muncy, Geissler, Olds & Lowe, PC (57) ABSTRACT

A pumping device includes a barrel, a pump, and a control valve. The barrel has a gas hole. The pump includes a cylinder and a piston movable in the cylinder. The piston partitions the cylinder into a first space and a second space. Air in the first space is able to enter the second space via a one-way mechanism, but not in reverse. The control valve includes a main body and a control element. The main body has a first hole, a second hole, a ventilation hole, an inlet, and an outlet. The first hole and the second hole communicate the gas hole. The inlet communicates the first space, and the outlet communicates the second space. The control element is movable to make the inlet communicate the first hole or the ventilation hole and to make the outlet communicate the ventilation hole or the second hole.

8 Claims, 7 Drawing Sheets

PUMPING DEVICE

BACKGROUND OF THE INVENTION

Field of the Invention

The present invention relates to a pumping device, more especially to a pumping device which is able to inject or to suck liquid.

Description of the Prior Art

Conventional pumping devices for pumping liquid can be classified into sucking devices and injecting devices which are reverse in direction. Thus, different devices have to be prepared. For example, when sucking oil from a container and then injecting into a vehicle, a sucking device and an injecting device are both necessary, and the oil has to be transferred from the sucking device into the injection device.

A bi-directional pumping device is shown in patent TW 1318961. The pump in the barrel and the switchable channels are used to change the mode of use. However, the structure is complicated, and the liquid may enter the pump or the channels accidentally. In addition, the barrel is difficult to clean and wash.

SUMMARY OF THE INVENTION

The main object of the present invention is to provide a pumping device having simple structure and quick switching between a sucking mode and a draining mode.

To achieve the above and other objects, the pumping device of the present invention includes a barrel, a pump, and a control valve.

The barrel encloses a receiving room and has a top portion. The top portion has a gas hole and a fluid opening. The fluid opening is connected with a fluid tube. A free end of the fluid tube extends into the receiving room. The pump includes a cylinder and a piston. The piston is movably arranged in the cylinder. The piston partitions the cylinder into a first space and a second space. The piston has a one-way mechanism. Gas in the first space is able to enter the second space via the one-way mechanism, but gas in the second space is avoided from entering the first space via the one-way mechanism. The cylinder further has a gas inlet and a gas outlet. The gas inlet communicates the first space, and the gas outlet communicates the second space. The control valve includes a main body and a control element. The main body has a cavity. The main body further has a first hole, a second hole, a ventilation hole, an inlet, and an outlet all communicating the cavity. The first hole and the second hole communicate the gas hole respectively via pipes. The ventilation hole communicates air outside. The inlet communicates the gas outlet of the cylinder via pipe, and the outlet communicates the gas inlet of the cylinder via pipe. The control element is movable between a first position and a second position in the cavity.

When the control element is located at the first position, the inlet communicates the ventilation hole instead of the first hole, the second hole, and the outlet, and the outlet communicates the second hole instead of the first hole, the ventilation hole, and the inlet. When the control element is located at the second position, the inlet communicates the first hole instead of the ventilation hole, the second hole, and the outlet, the outlet communicates the ventilation hole instead of the first hole, the second hole, and the inlet.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 7 and FIG. 4A, the pumping device of the present invention includes a barrel 10, a pump 20, and a control valve 30.

The barrel 10 encloses a receiving room and has a top portion. The top portion has a gas hole 11 and a fluid opening 12. The fluid opening 12 is connected with a fluid tube 13. A free end of the fluid tube 13 extends into the receiving room. In the present embodiment, the top portion is a cover, and the gas hole 11 and the fluid opening 12 are both formed on the cover.

The pump 20 includes a cylinder 21 and a piston 22. The piston 22 is movably arranged in the cylinder 21. The piston 22 partitions the cylinder 21 into a first space 211 and a second space 212. The piston 22 has a one-way mechanism. Gas in the first space 211 is able to enter the second space 212 via the one-way mechanism, but gas in the second space 212 is avoided from entering the first space 211 via the one-way mechanism. The cylinder 21 further has a gas inlet 23 and a gas outlet 24. The gas inlet 23 communicates the first space 211, and the gas outlet 24 communicates the second space 212.

The control valve 30 includes a main body 31 and a control element 32. The main body 31 has a cavity. The main body 31 further has a first hole 311, a second hole 313, a ventilation hole 312, an inlet 314, and an outlet 315 all communicating the cavity. The first hole 311 and the second hole 313 communicate the gas hole 11 respectively via pipes. The ventilation hole 312 communicates air outside. The inlet 314 communicates the gas outlet 24 of the cylinder 21 via pipe, and the outlet 315 communicates the gas inlet 23 of the cylinder 21 via pipe. The control element 32 is movable between a first position and a second position in the cavity. When the control element 32 is located at the first position, the inlet 314 communicates the ventilation hole 312 instead of the first hole 311, the second hole 313, and the outlet 315, the outlet 315 communicates the second hole 313 instead of the first hole 311, the ventilation hole 312, and the inlet 314. When the control element 32 is located at the second position, the inlet 314 communicates the first hole 311 instead of the ventilation hole 312, the second hole 313, and the outlet 315, and the outlet 315 communicates the ventilation hole 312 instead of the first hole 311, the second hole 313, and the inlet 314. Preferably, the control valve 30 is disposed on an outer wall of the barrel 10, and the barrel 10 and the cylinder 21 are disposed on a seat 40.

Specifically, the cavity partitions the main body 31 into a first side and a second side. An extending direction of the cavity is defined as a first direction. The first hole 311, the ventilation hole 312, and the second hole 313 are aligned at the first side along the first direction. The inlet 314 and the outlet 315 are aligned at the second side along the first direction. The inlet 314 is located between the first hole 311 and the ventilation hole 312, and the outlet 315 is located between the ventilation hole 312 and the second hole 313. The control element 32 includes a control portion 321 and an outer portion 322. The control portion 321 is received in the cavity, and the outer portion 322 is exposed out of the main body 31 for being pushed the control portion 321 to move between the first position and the second position. At least four O-rings are sleeved onto the control portion 321. The at least four O-rings are spacedly aligned along the first direction and abut against an inner wall of the cavity. According to positions of the O-rings with respect to the main body 31, the inlet 314 communicates one of the first hole 311 and the ventilation hole 312, and the outlet 315 communicates one of the ventilation hole 312 and the second hole 313. Preferably, the at least four O-rings includes a first O-ring 3211, a second O-ring 3212, a third O-ring 3213, and a fourth O-ring 3214. The first O-ring 3211 and the second O-ring 3212 are separately located at two sides of the inlet 314, and the third O-ring 3213 and the fourth O-ring 3214 are separately located at two sides of the outlet 315. When the control element 32 is located at the first position, the first O-ring 3211 is located between the inlet 314 and the first hole 311, and the third O-ring 3213 is located between the outlet 315 and the ventilation hole 312. When the control element 32 is located at the second position, the second O-ring 3212 is located between the inlet 314 and the ventilation hole 312, and the fourth O-ring 3214 is located between the outlet 315 and the second hole 313.

Besides, in the present embodiment, a ball-cock valve 14 is disposed in the barrel 10. The ball-cock valve 14 is movable at a side of the gas hole 11 facing the receiving room. When a level of liquid in the receiving room is higher than a predetermined value, the ball-cock valve 14 is lifted by the liquid to close the gas hole 11 to prevent liquid in the receiving room from entering the gas hole 11.

In the present embodiment, the one-way mechanism includes an annular gap 222, an annular blocking element 224, and at least one through hole 225. The piston 22 has an annular flange 221 at a top thereof. The piston 22 is formed with a receiving portion 223 at a lateral wall thereof. The receiving portion 223 is located below the annular flange 221 for receiving the annular blocking element 224. The annular blocking element 224 is axially movable in the receiving portion 223. The annular gap 222 is formed between the annular flange 223 and an inner wall of the cylinder 21. A side of the receiving portion 223 remote from the annular flange 221 is axially formed with the at least one through hole 225. The at least one through hole 225 and the annular blocking element 224 are at least partially staggered. The first space 211 of the cylinder 21 is located above the piston 22, and the second space 212 of the cylinder 21 is located below the piston 22. When the piston 22 moves downward, the annular blocking element 224 is moved upward to block the annular gap 222 so that gas in the second space 212 is avoided from entering the first space 211. When the piston 22 moves upward, the annular blocking element 224 is moved downward so that gas in the first space 211 is able to enter the second space 212 via the annular gap 222 and the at least one through hole 225.

Besides, the barrel 10 further includes a receiving tube 15. The receiving tube 15 is a blind pipe. A closed end of the receiving tube 15 extends into the receiving room. An opening of the receiving tube 15 is located at the top of the barrel 10 so that the receiving tube 15 is adapted for receiving pipes mentioned above.

Figure 1:
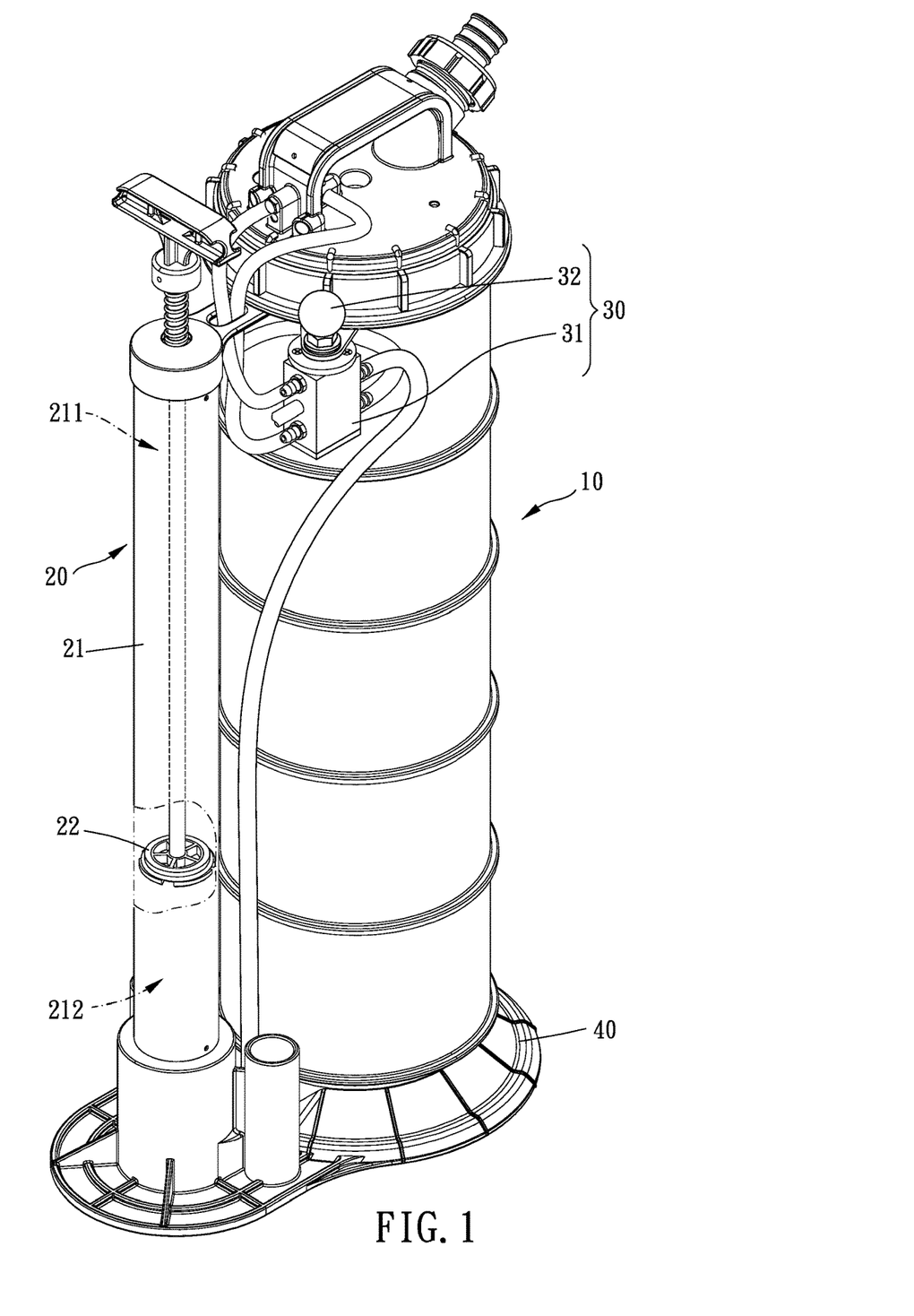
FIG. 1 is a stereogram of the present invention.
Figure 2:
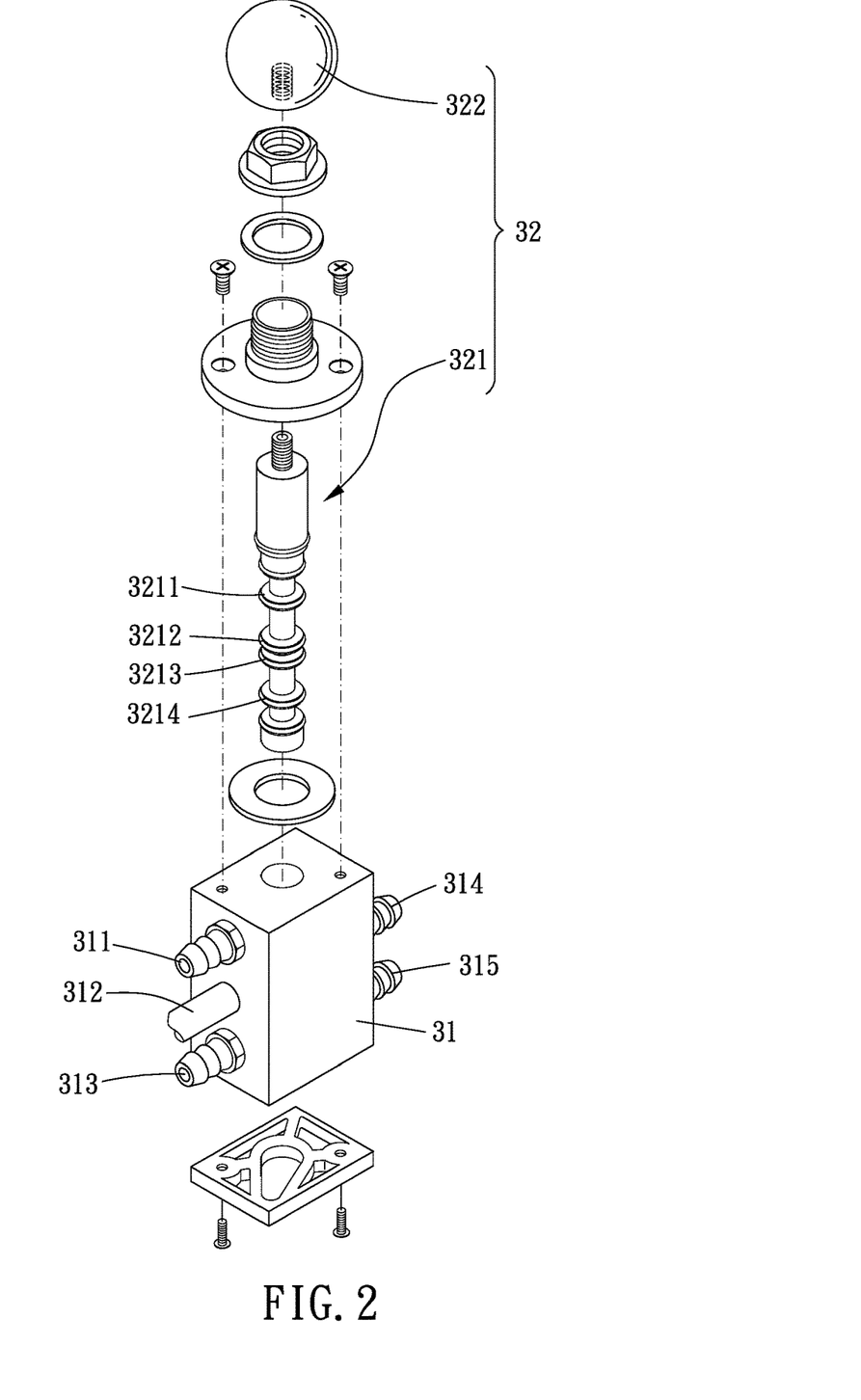
FIG. 2 is a breakdown drawing of a control valve of the present invention.
Figure 3:
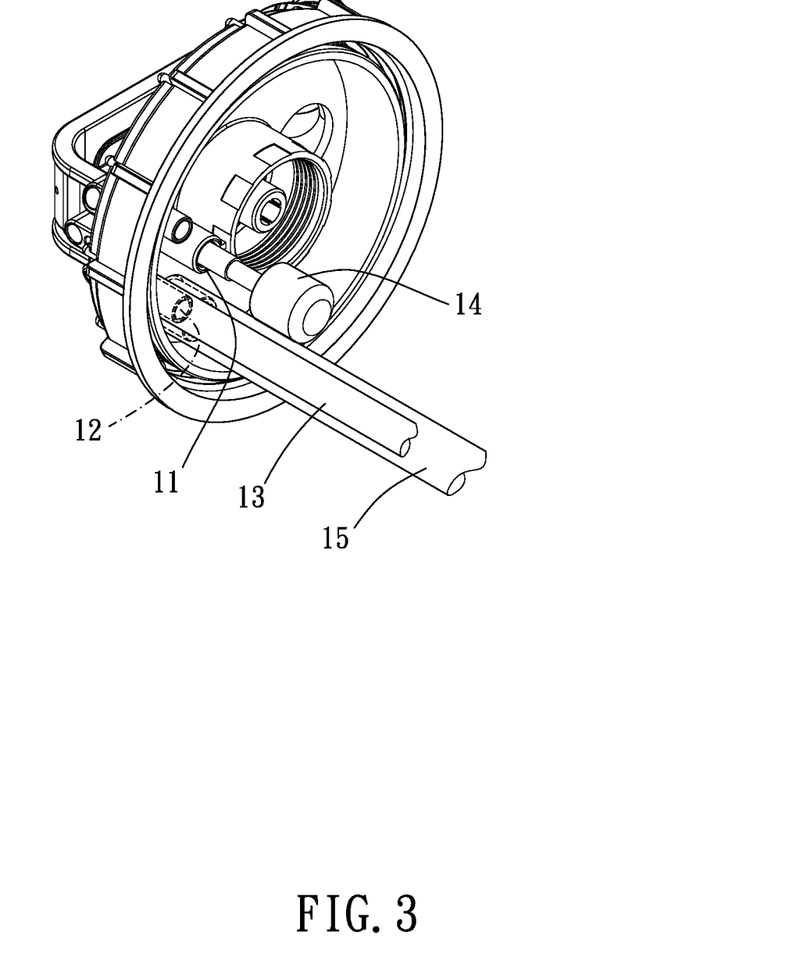
FIG. 3 is a partial stereogram of the present invention.
Figure 4:
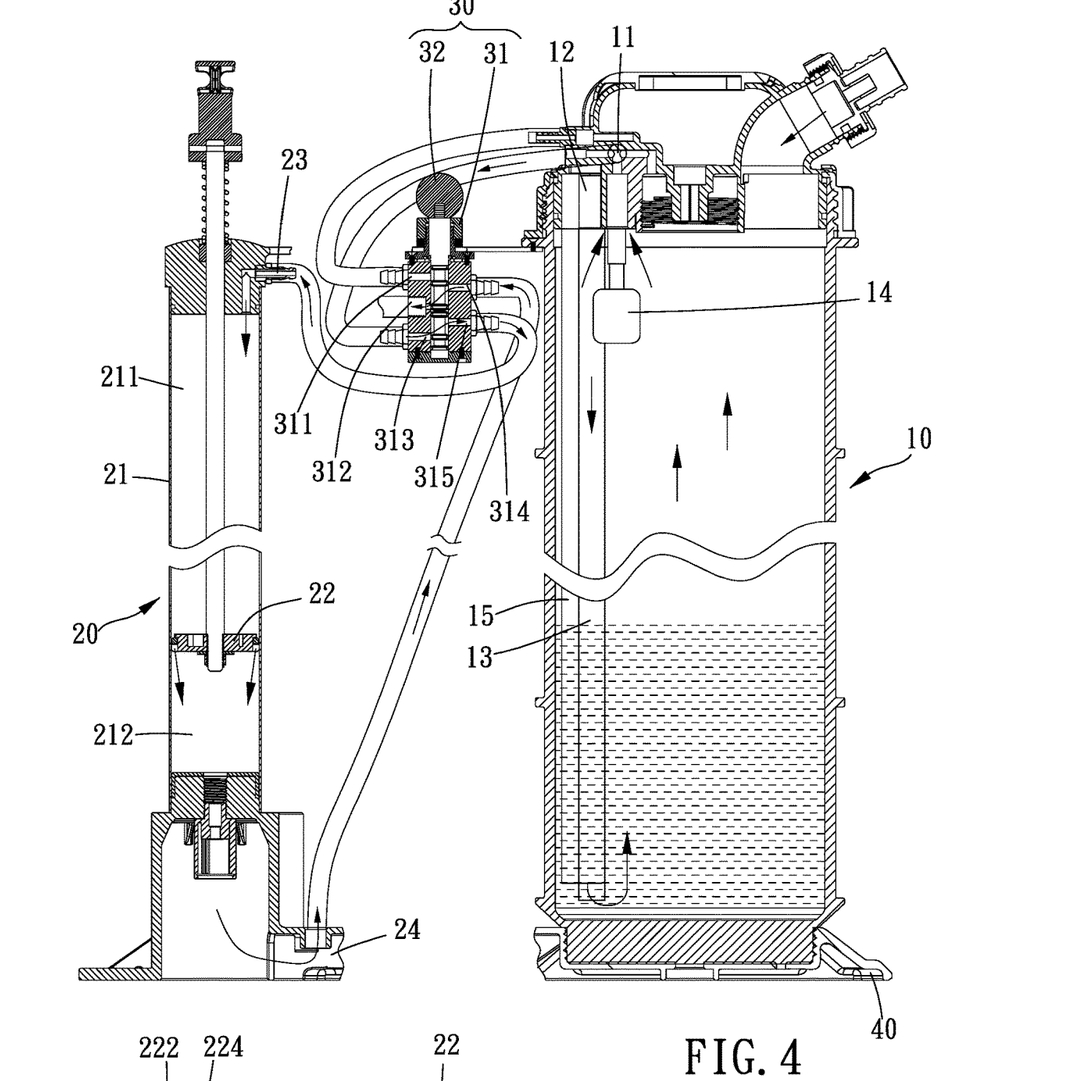
FIG. 4 is an illustration of the present invention when a control element is located at a first position.
Figure 4A:
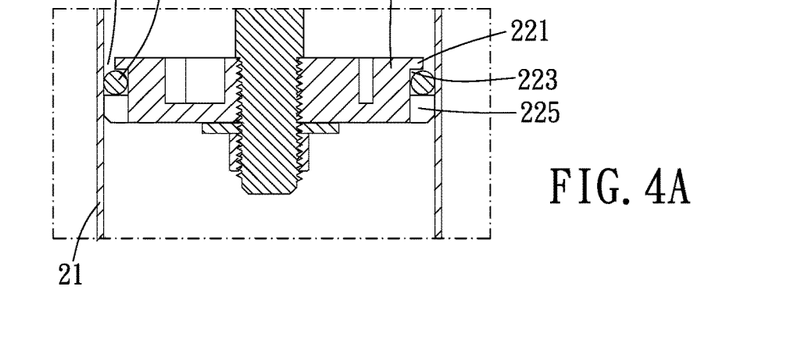
FIG. 4A is a partial enlargement of FIG. 4.
Figure 5:
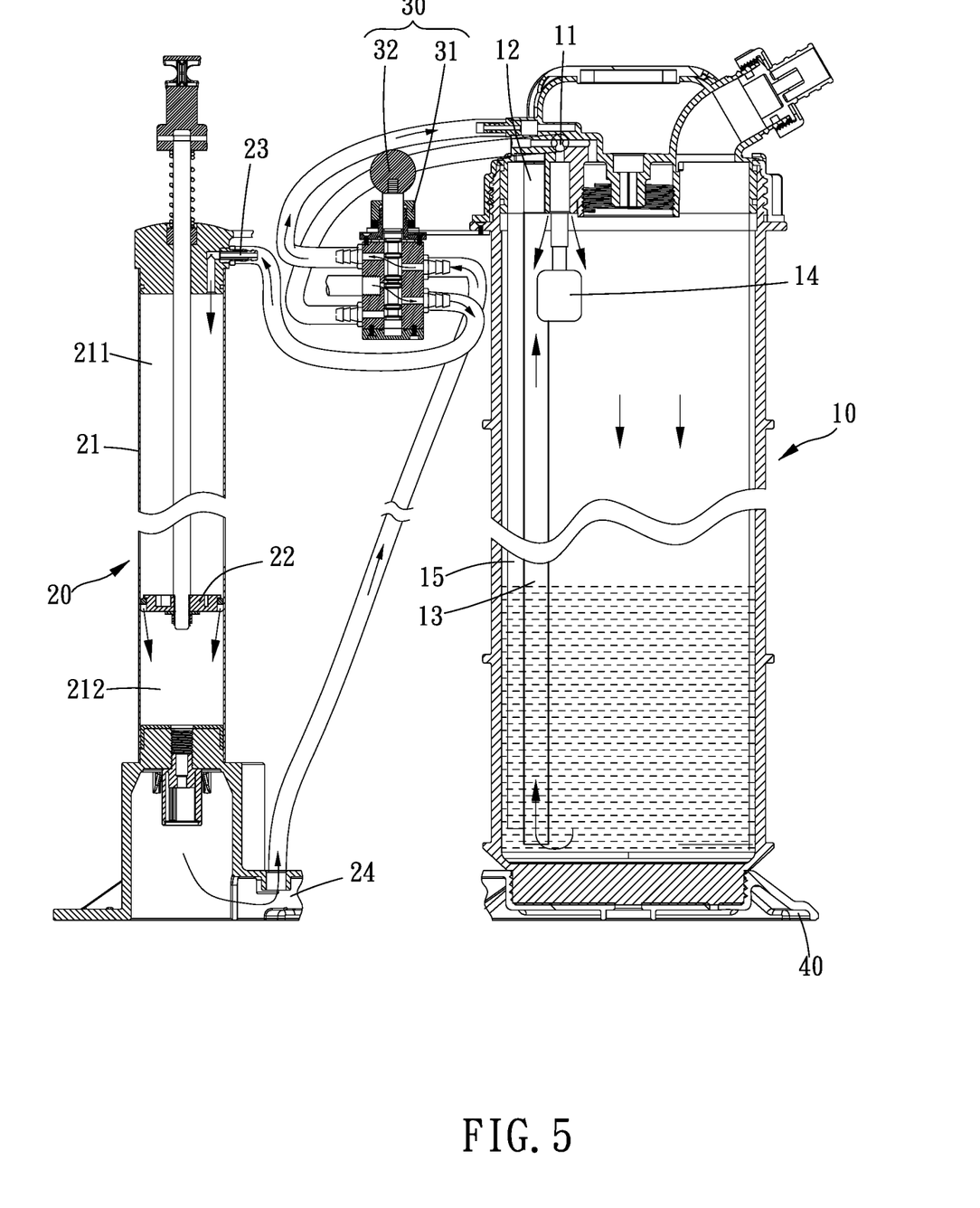
FIG. 5 is an illustration of the present invention when a control element is located at a second position.
Figure 6:
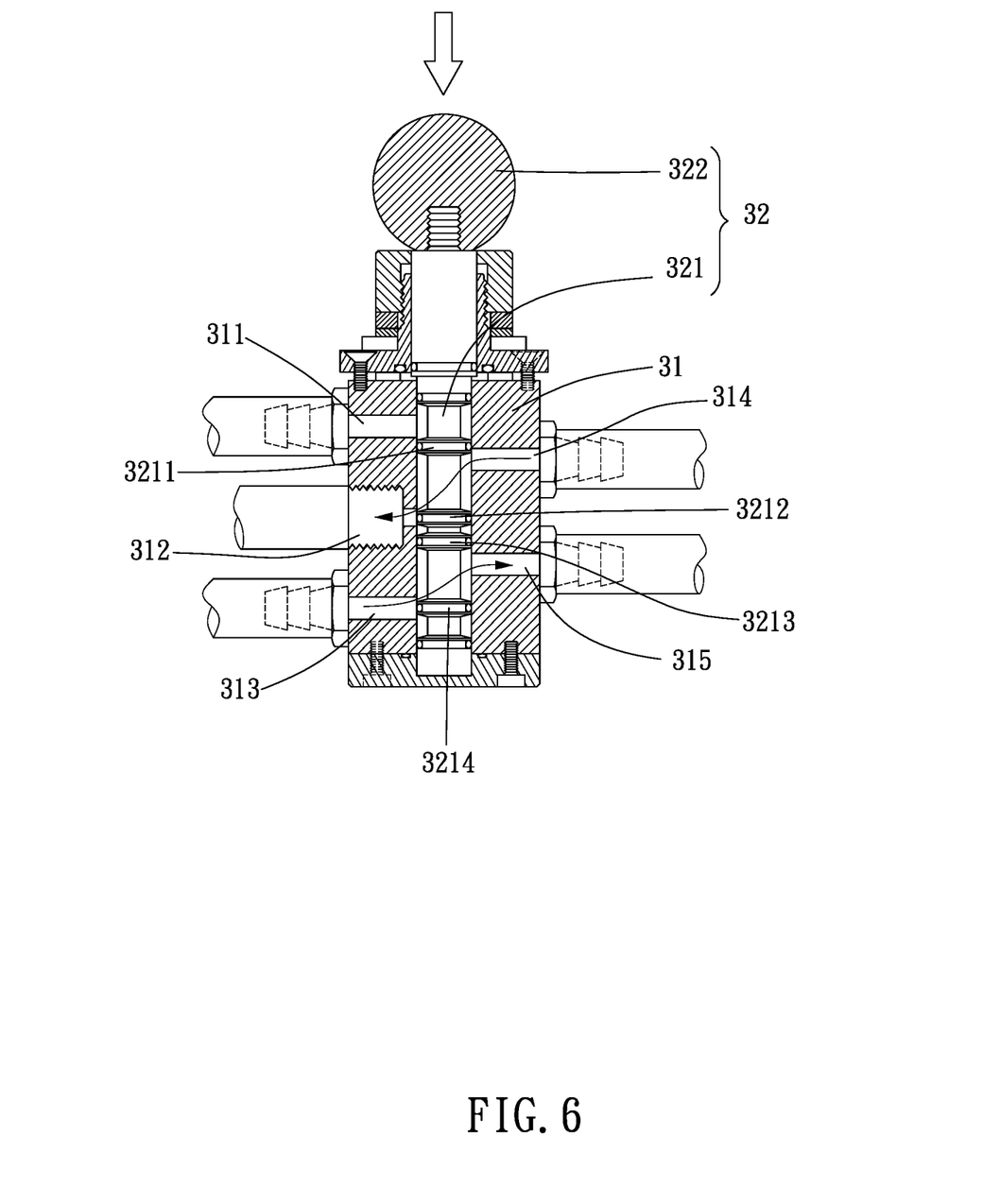
FIG. 6 is a partial enlargement of FIG. 4.
Figure 7:
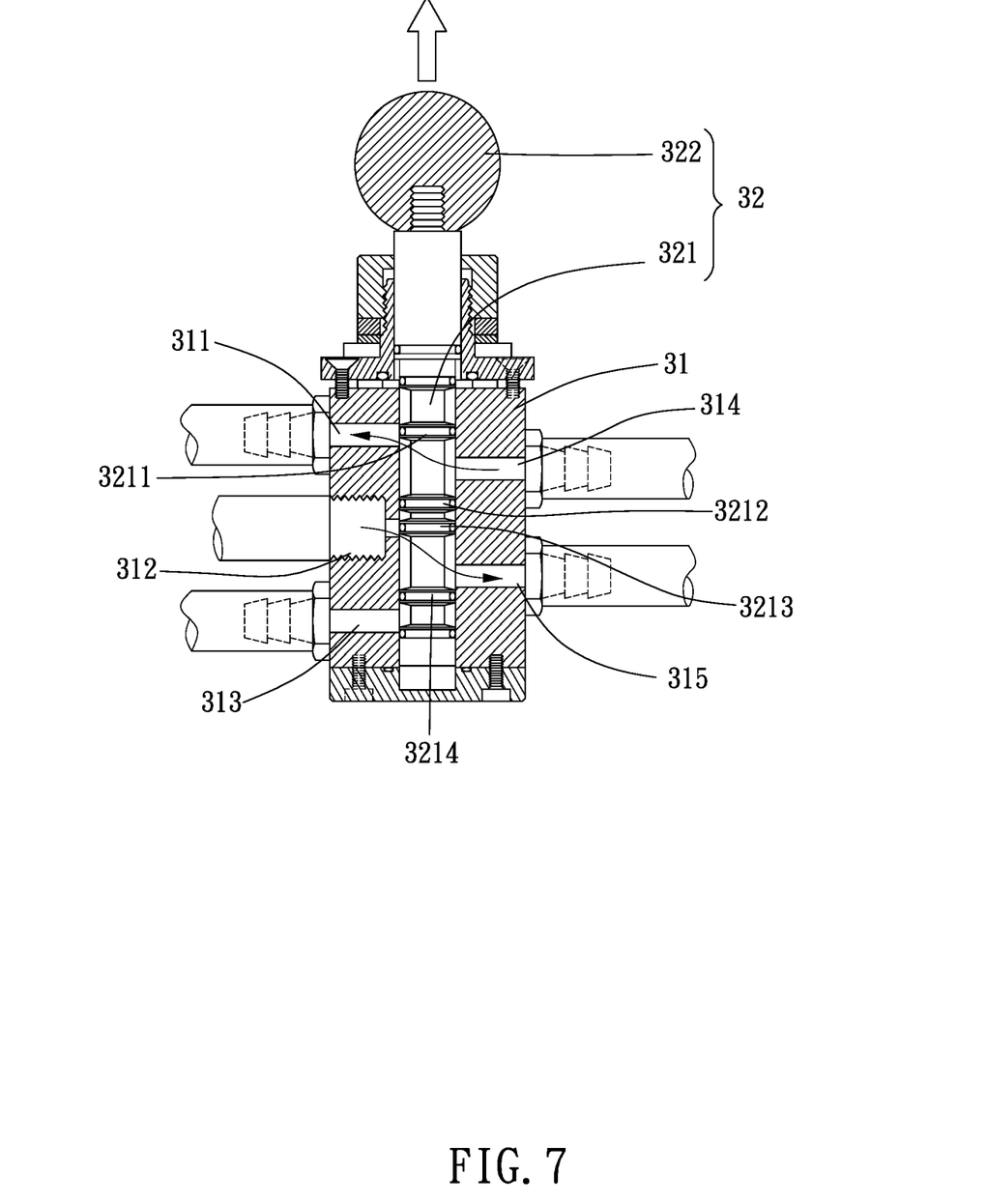
FIG. 7 is a partial enlargement of FIG. 5.

In use, when sucking liquid outside into the barrel 10 (for example, sucking waste oil in a vehicle out), the user can move the control element 32 to the first position, as shown in FIG. 4 and FIG. 6. And then, the user pushes and pulls the piston 22 of the pump 20 back and forth to suck liquid outside into the receiving room via the fluid opening 12 and the fluid tube 13. In addition, the ball-cock valve 14 can prevent the liquid in the receiving room from flowing into the gas hole 11 to contaminate the control valve 30 or the pump 20. On the contrary, when draining liquid in the barrel 10 (for example, injecting new oil into a vehicle), the user can move the control element 32 to the second position, as shown in FIG. 5 and FIG. 7. And then, the user pushes and pulls the piston 22 of the pump 20 back and forth to drain the liquid in the receiving room via the fluid tube 13 and the fluid opening 12.

In conclusion, the pumping device of the present invention has a simple structure and quick switching between the sucking mode and the draining mode. When switching, pipes and components have no need to be detached or replaced. Besides, liquid is prevented from flowing into the pump or the control valve.

What is claimed is:

1. A pumping device including:
   a barrel, enclosing a receiving room and having a top portion, the top portion having a gas hole and a fluid opening, the fluid opening being connected with a fluid tube, a free end of the fluid tube extending into the receiving room;
   a pump, including a cylinder and a piston, the piston being movably arranged in the cylinder, the piston partitioning the cylinder into a first space and a second space, the piston having an one-way mechanism, gas in the first space being able to enter the second space via the one-way mechanism, gas in the second space being avoided from entering the first space via the one-way mechanism, the cylinder further having a gas inlet and a gas outlet, the gas inlet communicating the first space, the gas outlet communicating the second space;
   a control valve, including a main body and a control element, the main body having a cavity, the main body further having a first hole, a second hole, a ventilation hole, an inlet, and an outlet all communicating the cavity, the first hole and the second hole communicating the gas hole respectively via pipes, the ventilation hole communicating air outside, the inlet communicating the gas outlet of the cylinder via a first pipe, the outlet communicating the gas inlet of the cylinder via a second pipe, the control element being movable between a first position and a second position in the cavity;
   wherein when the control element is located at the first position, the inlet communicates the ventilation hole instead of the first hole, the second hole, and the outlet, the outlet communicates the second hole instead of the first hole, the ventilation hole, and the inlet;
   wherein when the control element is located at the second position, the inlet communicates the first hole instead of the ventilation hole, the second hole, and the outlet, the outlet communicates the ventilation hole instead of the first hole, the second hole, and the inlet.

2. The pumping device of claim 1, wherein the cavity partitions the main body into a first side and a second side, an extending direction of the cavity is defined as a first direction, the first hole, the ventilation hole, and the second hole are aligned at the first side along the first direction, the inlet and the outlet are aligned at the second side along the first direction, the inlet is located between the first hole and the ventilation hole, the outlet is located between the ventilation hole and the second hole, the control element includes a control portion and an outer portion, the control portion is received in the cavity, the outer portion is exposed out of the main body for being pushed the control portion to move between the first position and the second position, at least four O-rings are sleeved onto the control portion, the at least four O-rings are spacedly aligned along the first direction and abut against an inner wall of the cavity, according to positions of the O-rings with respect to the main body, the inlet communicates one of the first hole and the ventilation hole, and the outlet communicates one of the ventilation hole and the second hole.

3. The pumping device of claim 2, wherein the at least four O-rings includes a first O-ring, a second O-ring, a third O-ring, and a fourth O-ring, the first O-ring and the second O-ring are separately located at two sides of the inlet, the third O-ring and the fourth O-ring are separately located at two sides of the outlet, when the control element is located at the first position, the first O-ring is located between the inlet and the first hole, the third O-ring is located between the outlet and the ventilation hole, when the control element is located at the second position, the second O-ring is located between the inlet and the ventilation hole, the fourth O-ring is located between the outlet and the second hole.

4. The pumping device of claim 1, wherein a ball-cock valve is disposed in the barrel, the ball-cock valve is movable at a side of the gas hole facing the receiving room, when a level of liquid in the receiving room is higher than a predetermined value, the ball-cock valve is lifted to close the gas hole to prevent liquid in the receiving room from entering the gas hole.

5. The pumping device of claim 1, wherein the one-way mechanism includes an annular gap, an annular blocking element, and at least one through hole, the piston has an annular flange at a top thereof, the piston is formed with a receiving portion at a lateral wall thereof, the receiving portion is located below the annular flange for receiving the annular blocking element, the annular blocking element is axially movable in the receiving portion, the annular gap is formed between the annular flange and an inner wall of the cylinder, a side of the receiving portion remote from the annular flange is axially formed with the at least one through hole, the at least one through hole and the annular blocking element are at least partially staggered, the first space of the cylinder is located above the piston, the second space of the cylinder is located below the piston, when the piston moves downward, the annular blocking element is moved upward to block the annular gap so that gas in the second space is avoided from entering the first space, when the piston moves upward, the annular blocking element is moved downward so that gas in the first space is able to enter the second space via the annular gap and the at least one through hole.

6. The pumping device of claim 5, wherein the annular blocking element is an elastic ring, the one-way mechanism includes a plurality of the through holes, the through holes are spacedly arranged an axial direction of the piston.

7. The pumping device of claim 1, wherein the control valve is disposed on an outer wall of the barrel, the barrel and the cylinder are disposed on a seat.

8. The pumping device of claim 3, wherein a ball-cock valve is disposed in the barrel, the ball-cock valve is movable at a side of the gas hole facing the receiving room, when a level of liquid in the receiving room is higher than a predetermined value, the ball-cock valve is lifted to close the gas hole to prevent liquid in the receiving room from entering the gas hole; the one-way mechanism includes an annular gap, an annular blocking element, and at least one through hole, the piston has an annular flange at a top thereof, the piston is formed with a receiving portion at a lateral wall thereof, the receiving portion is located below the annular flange for receiving the annular blocking element, the annular blocking element is axially movable in the receiving portion, the annular gap is formed between the annular flange and an inner wall of the cylinder, a side of the receiving portion remote from the annular flange is axially formed with the at least one through hole, the at least one through hole and the annular blocking element are at least partially staggered, the first space of the cylinder is located above the piston, the second space of the cylinder is located below the piston, when the piston moves downward, the annular blocking element is moved upward to block the annular gap so that gas in the second space is avoided from entering the first space, when the piston moves upward, the annular blocking element is moved downward so that gas in the first space is able to enter the second space via the annular gap and the at least one through hole; the annular blocking element is an elastic ring, the one-way mechanism includes a plurality of the through holes, the through holes are spacedly arranged an axial direction of the piston; the barrel further includes a receiving tube, the receiving tube is a blind pipe, a closed end of the receiving tube extends into the receiving room, an opening of the receiving tube is located at the top of the barrel so that the receiving tube is adapted for receiving pipes.

* * * * *